Figure 1:
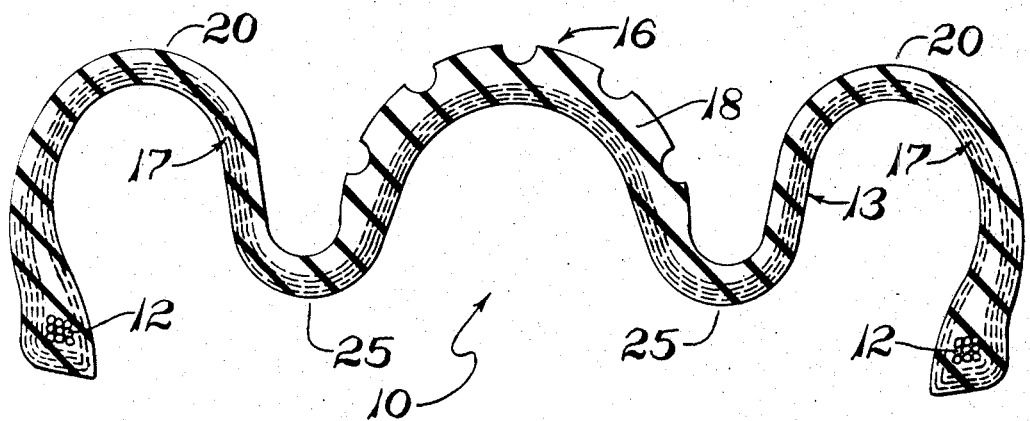

Oct. 17, 1967

J. SIDLES 3,347,301

TIRE

Filed July 20, 1965

INVENTOR.
JAMES SIDLES
BY John D. Haney
ATTY.

3,347,301
TIRE
James Sidles, Cuyahoga Falls, Ohio, assignor to The B. F. Goodrich Company, New York, N.Y., a corporation of New York
Filed July 20, 1965, Ser. No. 473,369
10 Claims. (Cl. 152—352)

This invention relates to pneumatic tires, and more particularly to an improved pneumatic tire especially adapted for intermittent load-carrying service such as on spare-tire wheels ordinarily carried in automotive vehicles, or on aircraft wheels.

According to this invention, this improved pneumatic tire has at least one flexible fold permanently set in the flexible carcass of the tire so that the external diameter and overall lateral width of the tire are very much smaller when it is deflated than when it is inflated. For example, a passenger car tire made according to this invention may have its outside diameter (measured at the crown of the tread) in the order of 30% smaller when the tire is deflated than when it is inflated. The lateral width of the tire may be about 10% smaller when deflated than when inflated. Accordingly, the total space occupied by a tire-and-wheel assembly using such tire is about 50% smaller when the tire is deflated than when the tire is inflated. For aircraft service, there may be an even greater difference in the size and overall volume between the deflated and inflated condition of a typical tire-and-wheel assembly.

A tire embodying this invention may be made with conventional service-proven tire-making components and materials. That is to say, the tire has a pair of laterally spaced annular inextensible beads with an interconnecting flexible carcass of elastomer-coated tire ply fabric and an external ground-engaging tread. The fold in the carcass is permanently set by molding when the tire is vulcanized, and it extends generally radially of the carcass. The fold may be made in the tread region itself or in the sidewall region near the tread. In any event, the fold forms a continuous uninterrupted reentrant channel in the carcass which is generally radial and which is open to the outside surface of the tire carcass. Preferably there are several similar folds formed in the carcass. The tire is also made for mounting on an industry-standard style wheel or rim.

The tires of this invention are normally maintained in their smaller deflated condition on their respective service wheels, and are inflated to their larger operating size only during the periods the wheels are in actual operating or load-carrying service. Owing to the inherent stiffness of the flexible carcass, and the elasticity of the elastomer matrix of the carcass, a tire of this type normally asumes and remains in the collapsed or folded configuration in which it has been molded so long as it is deflated and is otherwise free of externally applied deforming forces. During inflation, the flexible folded portion of the carcass is displaced radially so that it flexibly unfolds, and the carcass is elastically expanded by the inflation medium until the tire carcass assumes the characteristic open-bellied toroidal shape of a common pneumatic tire of the prior art. When fully inflated, these tires look and operate substantially like any prior art tire of corresponding size for the same service. On subsequent deflation, however, the carcass region elastically contracts to collapse the tire to its initial smaller size, with the sidewall region refolding into the original molded configuration.

For automotive service the principal utility of this improved tire is in the space-saving advantages it provides during the period the tire is stored in the vehicle before it is placed in actual load-carrying service. The improved tire is ordinarily mounted on a regular spare wheel and may be stored in the vehicle indefinitely in deflated condition.

It is quickly inflated with a bottle of compressed gas or other available inflation equipment when it is eventually mounted on a vehicle wheel for load carrying.

For aircraft service, tires according to this invention are inflated only for landing and taxiing or parking, and are deflated whenever the aircraft is airborne and the wheels are retracted into their wheel wells. This advantageously eliminates the inherent hazard of storing a tire inflated to a high pressure inside an aircraft wheel well where the tire could possibly fail explosively. Moreover, these improved tires may be proportioned so that in their smaller inflated condition they will fit easily inside the wheel wells, but they may be inflated to a size very much larger than the wheel well, after the wheels are extended. These effectively larger size tires are more desirable for ordinary landing operations and they make it feasible to operate many existing aircraft on rough unimproved runways. Systems for in-flight inflation and deflation are well within the present state of the art.

Figure 2:
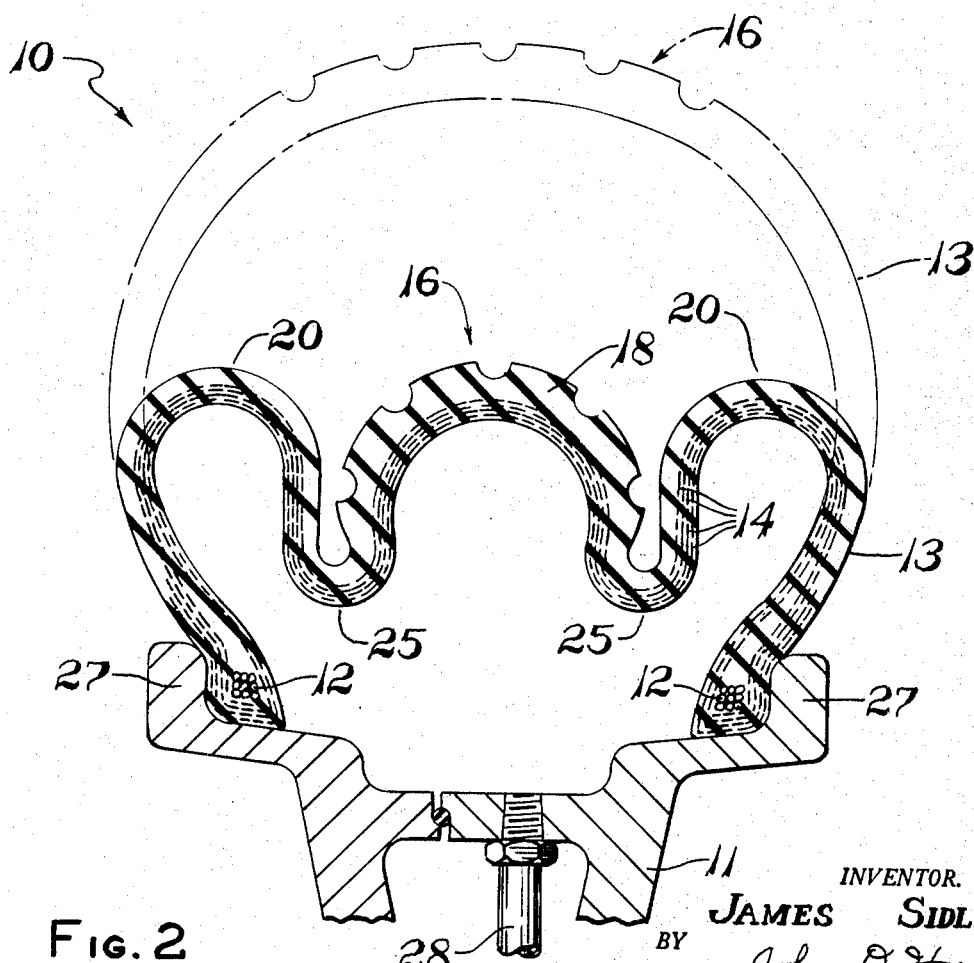

A tire made in accordance with and embodying this invention is shown in the accompanying drawing as one example of the manner in which this invention may be practiced. The drawing more particularly shows a cross section of a collapsible or folding tire designed for aircraft service and mounted on a common style aircraft wheel rim. FIG. 1 shows the cross section of a tire of preferred design approximately as it appears when removed from the mold after vulcanizing, or when it is not mounted on a wheel. FIG. 2 shows the cross section of the same tire in solid lines but when it is deflated and therefore in collapsed condition. The inflated cross section is approximately as shown in the chain-dotted lines in FIG. 2.

Referring to FIG. 2 of the drawing, the tire 10 is shown mounted on a common style aircraft wheel 11. Structurally, the tire 10 has a pair of annular laterally spaced inextensible beads 12 with a flexible carcass 13 extending between and fastened to each of the beads. The carcass as shown includes four fabric plies 14 and an external ground-engaging tread portion 16. The carcass further includes opposing flexible sidewall regions 17, 17 between the beads 12 and tread region 16.

The foregoing components of the tire are preferably made of conventional service-proven tire-making materials for the particular service the tire is intended. The beads 12 are preferably wire-wound grommets and the plies 14 are fastened to the beads all in accordance with common industry practice for building aircraft tires. The plies 14 are preferably conventional tire cord fabrics (wefted or weftless) such as nylon, rayon, or special polyester cords and any number of such plies may be used. Four plies are shown here merely for illustration. The elastomeric coatings on the fabrics are likewise conventional tire-making rubber compounds suitable for aircraft tires, as is the tread region 16. The point being made here is that the tire of this invention does not rely on any specially selected materials to provide the improved results.

Additionally, this tire may be built on conventional aircraft tire production machinery. That is to say, the tire may be built in cylindrical form according to the so-called flat band tire-making method. The tire cord material from which the plies 14 are made is initially coated with an elastomer and then bias cut and laid with the cord angle of successive plies opposing each other in the usual manner. The resulting cylindrical green tire carcass is then axially compressed into a special mold (not shown) which has a molding surface contour for imparting to the tire a permanent molded configuration substantially as shown in FIG. 1.

This tire is molded with its carcass sharply arched at numeral 18 in the tread region 16 and also with its sidewall regions 17, 17 of the carcass similarly arched at numerals 20, 20. The arched portions 18 and 20 are generally radial of the tire. The two sidewall arches, or lobes 20 define with the arch 18 of the tread region two permanent flexible hairpin-shaped folds 25 extending circumferentially around the tire. That is to say, the carcass of the tire is folded on itself at numerals 25 during the molding operation so that the carcass is permanently set in the folds 25, 25 which are oriented generally radially of the tire and are mutually parallel each other. The folds 25 in the deflated condition of the tire define a pair of continuous uninterrupted annular reentrant channels each open to the exposed or outside surface of the tire.

The beads 12 of the tire are preferably molded so that they form an interference fit with the adjoining bead seat regions of the wheel rim along the internal surface of the rim flanges 27.

The tire preferably further includes the usual materials and features to enable the tire to operate satisfactorily in tubeless condition. These features are well known in the art and for this reason they are not described in detail here. The tire may be inflated or deflated by a standard rim-mounted inflation valve 28.

After the tire is initially mounted on its rim 11, preferably it is inflated just enough to wedge the beads 12 tightly against the respective bead seats of the rim. Thereafter with the tire fully deflated, the beads normally tend to remain snugly seated in the bead seats in the manner shown. For convenience in molding the tire, and to assist in maintaining the beads properly seated after a mounted tire is deflated, the tire is preferably molded with the beads 12 spaced laterally a slightly greater distance than the actual distance between the inside surfaces of the rim flanges 27. This difference may be noted by comparing FIG. 1 with the solid line cross section of the tire in FIG. 2.

To place the resulting tire-and-rim assembly in load-carrying service, any suitable inflation mechanism may be used to introduce an inflating medium through valve 28 into the chamber defined by the interior surface of the tire and the rim 11. A bottle (not shown) of compressed air or carbon dioxide may be used for quick, convenient inflation. Progressive inflation of the tire stretches the carcass circumferentially and progressively unfolds the hairpin-like folds 25. The apices of the folds, indicated by numerals 25, 25 are displaced radially (approximately) until the tire assumes the generally toroidal shape indicated by the chain dotted lines in FIG. 2. In other words, inflation of the tire tends to "reverse" the contour of the folds 25, 25 so that instead of an inwardly folded region, these portions of the carcass become convex, or nearly so, on their outside surface when the tire is fully inflated. When fully inflated the tire functions like any other tire of the same class and size. For emergency use in passenger cars, this improved tire may have a significantly thinner tread than would ordinarily be used with a conventional passenger car tire. The thinner tread emergency tire would be operated in load-carrying service only for a period sufficient to enable the main wheel tire to be repaired. By an appropriate selection of the tread dimensions and tread and carcass materials, however, the mileage available for a tire of this class may be varied significantly.

On release of inflation pressure, the elasticity of the carcass portion, including particularly the tread region 16 of the carcass and the permanently set folds 25, 25, causes the carcass to return or re-fold itself automatically to the position shown in solid lines in FIG. 2.

The carcass portion of this tire is capable of accommodating the unusually great circumferential elongation or expansion between the deflated and inflated condition by a combination of the elasticity of the elastomer matrix in which the tire cord fabric is molded and by the pantographing action of the tire cords in the plies 14 of the fully cured tire. A typical tire made according to this invention may be built up by wrapping elastomer-coated plies 14 of tire cord about a cylindrical building drum having a diameter about equal to the minimum interior diameter of the tire at the apices of the folds 25 so that the cords of these plies form an angle to a circumference of the building drum of about 60 to 65°. At the conclusion of the building stage, the resulting cylindrical green tire casing is then axially compressed and molded substantially to the shape shown in FIG. 1. The steps of shaping the green carcass and molding it may shift the original cord angle to about 55–60° to the medial circumferential center line of its tread region at the crowns of the arch portions 18, 20, 20 whereas at the apices 25, 25 of the folds the cord angle will remain at about the original 60–65° range. This relatively small cord angle shift or "pantographing" of the cords in the arches during the molding results from the relatively low profile of these arches, and the cord shift which does occur in molding this tire is very much less than the corresponding action of the cords which normally occurs where a similarly built tire is cured in the regular familiar toroidal form.

A much greater pantographing or cord angle shift occurs, however, at the apices of the folds 25, 25 during inflation of the tire after it is fully cured. Thus, the angle of the cords at the apices of the folds 25, 25 may tend to shift from about 60–65° when the tire is fully cured but in deflated condition to about 35–45° when the tire is fully inflated. Again, the angle noted is the acute angle of the cords to the medial center line of the tire. Moreover, on inflation, the cord angle of the arches 18, 20, 20 similarly shifts to about 35–40° on inflation. The elastic character of the elastomer matrix in which the cords are molded permits such a radical pantographing action of the tires between the inflated and deflated condition. The cords, of course, shift back to the original angles at which they were cured after deflation of the tire. The tire cords themselves in this tire are not intended to and do not themselves appreciably elongate during the elastic expansion of the tire carcass as it is inflated. The remarks in the foregoing description about the expansion of the tire carcass are intended to refer to an expansion involving a shifting or pantographing action of the tire cords. A tire carcass does not stretch uniformly in all directions when inflated like a homogeneous wall pressure vessel such as a balloon.

The foregoing angular ranges have been cited merely to illustrate the order of magnitude of the changes in cord angle which occurs in one specific size tire from the time the uncured carcass plies are laid up on the cylindrical building drum to the time the cured tire is fully inflated. The actual selection of cord angles in making these tires will follow conventional practice and will depend primarily on the ultimate shape desired for the tire cross section after it is fully inflated, and also on the intended service for the tire.

The cord angle shift effect which occurs in this type tire also occurs in common pneumatic tires. In this new tire, however, there is a very much greater shift in cord angle during inflation and deflation than would ordinarily occur in common tires. A common tire is ordinarily cured in about the same shape it will have after inflation. Consequently all the significant cord angle shift occurs in the shaping and curing steps. Except for cord angle shifts which occur in localized distorted regions, there is very little change in the cord angle after curing in a common pneumatic tire.

The folds 25, 25 in the carcass of the illustrated tire are substantially parallel each other radially of the tire. Each fold 25 extends radially inward almost to the same diameter as the beads. The apex of each fold is formed at about the tread shoulder, but the tread may be much wider so that the fold occurs in more of the tread region, if desired. The radial depth of each fold 25 may be varied depending on the size and shape desired for the inflated configuration of the tire. If the folds are more shallow than those illustrated, the overall external diameter (and circumference) and/or the lateral width of the inflated tire would be correspondingly reduced. On the other hand, these dimensions of the tire in its inflated condition may be significantly increased by forming the folds 25 of deeper or greater radial extent than those shown even to the extent of making the folds so that their inner diameter at the apices is smaller than the bead diameter.

A tire according to this invention may be made with a fewer or a greater number of plies than the four shown in the drawing and may have a thicker or thinner tread as desired. Such tires may additonally include other special structural details such as fabric reinforcements of the tread. Also, although the tire described in the foregoing example is made with bias-laid cords, the principles of this invention may also be adapted to radial cord tires and still other tire constructions such as filament or tape-wound tires.

What is claimed is:

1. A pneumatic tire inflatable to a generally toroidal shape, the tire comprising a pair of laterally spaced annular beads and an annular flexible carcass of elastomer-coated fabric with a circumferential tread region and opposing sidewall regions between said tread region and each bead, at least one of said regions of the carcass having a permanently set flexible fold which, when the tire is deflated, normally extends circumferentially of the carcass in a continuous reentrant channel which is generally radial of the tire and is open to the outside surface of the carcass, the fold having an apex diameter about equal to the bead diameter when the tire is deflated, and the carcass being elastically distensible by an inflation medium to unfold said folded region and increase said apex diameter until it is substantially larger than the bead diameter when the tire is inflated.

2. A tire according to claim 1 wherein the apex of said fold is in a region of the carcass where a sidewall region joins said tread region.

3. A tire according to claim 1 wherein said carcass has one such fold in each said sidewall region adjoining said tread region, the folds being substantially parallel.

4. A pneumatic tire according to claim 1 in which said elastomer-covered fabric includes bias-laid tire cord fabric and wherein the elastomer covering said cords has sufficient elasticity in its vulcanized state to accommodate shifting of said cords in said carcass to significantly different angles to the medial circumferential center of the tread region between the inflated and the deflated position of the tire to provide for said elastic distension of said carcass.

5. An inflatable tire having an annular flexible carcass of elastomer-covered fabric terminating in a pair of annular beads, a portion of the carcass being permanently set in a flexible fold which, when the tire is deflated, normally extends circumferentially of the carcass to provide a continuous reentrant channel on the outside surface of the carcass and which fold has an apex diameter which is not much different from the diameter of the beads, and the carcass being elastically distensible by an inflating medium so that said fold is adapted to unfold to a reverse curvature and thereby greatly increase the apex diameter of said fold when the tire is inflated.

6. An inflatable tire according to claim 5 in which said elastomer-covered fabric of said carcass comprises bias-laid cords and wherein the elastomer covering said cords has sufficient elasticity in its vulcanized state to allow shifting of said cords in said folded portion of the carcass to significantly different angles relative to the medial circumfereential center of said carcass between said inflated and deflated positions to accommodate said diameter changes of the apex of said fold.

7. An inflatable tire as defined in claim 5 wherein the portions of said carcass in said fold extend generally radially of said carcass when the tire is deflated.

8. An inflatable tire as defined in claim 5 wherein the carcass has a medial tread portion and a sidewall portion extending from said tread portion to each bead, and wherein an apex of said fold is substantially at the juncture of one of said sidewall portions and said tread portion.

9. A vulcanized inflatable tire having an annular flexible carcass of elastomer-covered fabric which carcass includes a pair of annular beads connected by sidewall portions to an annular tread portion, the margins of the tread portion normally being about the same diameter as the beads and the sidewall portions normally being folded toward the beads when the tire is deflated, and said carcass portion being elastically distensible by the tire inflating medium so that said tread margins are increased to a diameter much larger than the beads and said sidewall portions are unfolded when the tire is inflated.

10. A vulcanized pneumatic tire having an annular flexible carcass of elastomer-covered fabric terminating in a pair of annular beads, a portion of the carcass being normally folded on itself circumferentially of the tire when the tire is deflated and said portion being adapted to unfold in response to an inflating medium when the tire is inflated, regions of said folded portion being of appreciably smaller circumferential diameter in their deflated folded positon than in their unfolded inflated position, and said elastomer-covered fabric including bias-laid cords in an elastomer matrix which has sufficent elasticity in its vulcanized state to allow shifting of said cords in said folded portion of the carcass to significantly different angles relative to the medial circumferential center of said carcass between said inflated and deflated positions to accommodate said diameter changes in regions of said folded portion of the carcass.

References Cited

UNITED STATES PATENTS 2,882,738   4/1959   Camenzino _____ 152—330 X
2,955,635   10/1960  Miller _____ 152—330

ARTHUR L. LA POINT, *Primary Examiner.*

C. W. HAEFELE, *Assistant Examiner.*